United States Patent [19]
Noda et al.

[11] Patent Number: 5,718,549
[45] Date of Patent: Feb. 17, 1998

[54] RELEASABLE TWO-PART FIXING CLIP

[75] Inventors: Yusuke Noda, Hadano; Oomi Arisaka, Chigasaki; Koji Arakawa, Fujisawa, all of Japan

[73] Assignees: Piolax, Inc.; Nissan Motor Co., Ltd., both of Yokohama, Japan

[21] Appl. No.: 633,552

[22] Filed: Apr. 17, 1996

[30] Foreign Application Priority Data

Apr. 17, 1995 [JP] Japan .................. 7-114070

[51] Int. Cl.[6] .................................. F16B 21/00
[52] U.S. Cl. .................. 411/553; 411/508; 411/349
[58] Field of Search .................... 411/349, 551, 411/553, 549, 508, 509, 913

[56] References Cited

U.S. PATENT DOCUMENTS

| | | | |
|---|---|---|---|
| 2,385,180 | 9/1945 | Allen | 411/551 |
| 2,879,574 | 3/1959 | Zahodiakin | 411/551 |
| 4,743,152 | 5/1988 | Nakayama | 411/508 |
| 4,971,500 | 11/1990 | Benoit | 411/508 |
| 5,193,961 | 3/1993 | Hoyle | 411/553 |
| 5,222,852 | 6/1993 | Snyder | 411/553 |
| 5,468,109 | 11/1995 | Ferrari | 411/553 |

FOREIGN PATENT DOCUMENTS

| | | |
|---|---|---|
| 61-37847 | 11/1986 | Japan . |
| 2-50508 | 4/1990 | Japan . |

*Primary Examiner*—Flemming Saether
*Attorney, Agent, or Firm*—Wenderoth, Lind & Ponack

[57] ABSTRACT

A fixing clip includes a female member and a male member. The female member includes a flange, a barrel and an inner hole bored from the flange through the barrel thereof. The male member is provided with a shank for insertion into the inner hole of the female member. The inner hole of the female member is a blind hole rectangular in cross section and open exclusively at the flange. The blind hole has the opposed inner wall surfaces provided with a pair of engaging projections. The shank of a male member has the leading end of a width smaller than a distance between the engaging projections. The leading end of the shank has a pair of protruding shoulders of a width substantially the same as the smaller width and of a length slightly larger than the distance between the engaging projections so that the protruding shoulders can be engaged with the engaging projections, and forms in lateral parts existing on a diagonal line of the protruding shoulders cut faces for allowing rotation of the male member when the male member is to be extracted from the female member.

10 Claims, 5 Drawing Sheets

RELEASABLE TWO-PART FIXING CLIP

BACKGROUND OF THE INVENTION

1. Field of the Invention

This invention relates to a fixing clip that is particularly waterproof and two-piece type clips which are used for fixing various fitting parts to panels in an automobile.

2. Description of the Prior Art

As one example of a conventional two-piece type fixing clip of this class, what is disclosed in JUM-B-61-37847 may be cited.

The conventional fixing clip consists of two components, i.e. a female member having an inner hole bored from a flange portion through a barrel portion thereof, and a male member provided with a shank adapted to be inserted into the inner hole of the female member. The female member has a structure such that the inner hole thereof passes through not only the flange portion but also the lower end of the barrel portion and, at the same time, the barrel portion thereof is split by a plurality of slits, and each of the split barrel pieces is provided on the inner surface thereof with engaging projections. The male member has a structure such that the shank thereof is pendent from an enlarged head and provided on the periphery thereof with a helically stepped portion.

For actual use of the conventional fixing clip, the barrel portion of the female member is engaged fast with both a through hole bored in advance in a fitting part and a fitting hole bored in advance in a panel. Then the shank of the male member is inserted into the inner hole of the female member. As a result, the fitting part is fixed to the panel because the engaging projections of the split barrel pieces are brought into engagement with the helically stepped portion and, at the same time, the split barrel pieces are expanded outward through the slits.

Conversely, when the fitting part happens to require to be removed from its fixed state, the male member is continuously rotated in a prescribed direction by utilizing operating grooves formed in the enlarged head of the male member. As a result, the fitting part can be removed from the panel because the shank of the male member is pulled out of the inner hole of the female member owing to the function of the helically stepped portion of the shank.

The conventional fixing clip of this structure is at an advantage in not only enabling the fitting part to be infallibly fixed to the panel but also allowing the fitting part to be removed from the panel when necessary. On the other hand, it is unfit for use at sites which demand waterproofness because the inner hole bored in the barrel portion of the female member assumes the shape of a through hole and the barrel portion is so adapted as to be divided with the plurality of slits and consequently allowed to expand outward.

A fixing clip which is intended for use at sites demanding waterproofness, though not specifically illustrated, generally adopts a structure such that the inner hole bored in the barrel portion of a female member assumes the shape of a blind hole closed with a bottom wall and exclusively compels a stepped portion formed on a male member to be forcibly engaged with an engaging projection formed inside the blind hole of the female member.

In the structure which resorts to this blind hole, when the necessity arises for the fitting part to be removed from the panel, the removal requires the shank of the male member to be forcibly pulled out of the blind hole. The work of removing the fitting part, therefore, turns out to be an excessively burdensome job. It is fairly possible that the force exerted on the fitting part during the removal will inflict damage on the engaging projection and render it no longer serviceable.

To eliminate these inconveniences, JUM-A-02-50508, for example, has proposed a fixing clip which is provided with a separate waterproofing cap.

Though the prior art fixing clip uses the same female member and male member as the aforementioned conventional fixing clip, the separate waterproofing cap of the prior art fixing clip comprises a flange part adapted to collide against the edge of a fitting hole bored in a given panel and a bag part adapted to open only at the flange part. The prior art fixing clip is particularly intended to ensure that the connecting parts of the male and female members are waterproof by causing the female member to be stowed in the bag part.

Therefore, the prior art fixing clip secures thorough waterproofness due to the presence of the waterproofing cap even despite the use of the female member, and the male member both destitute of waterproofness and, at the same time, permits relatively easy separation of the fitting part from the panel.

In consequence of the use of the waterproofing cap, the prior art fixing clip entails an increase in the number of component parts thereof and an addition to the number of steps of operation to be involved in the manufacture thereof and contradicts the present-day demand for rationalization as compared with the standard two-piece type fixing clip.

SUMMARY OF THE INVENTION

A main object of this invention is to provide a fixing clip which, in due respect of the tasks faced by the conventional and prior art fixing clips described above, is endowed to be waterproof and adapted to permit very easy separation of a given fitting part.

To accomplish the object, this invention provides a fixing clip comprising a female member including a flange, a barrel and an inner hole bored from the flange through the barrel thereof, and a male member provided with a shank for insertion into the inner hole of the female member. The inner hole of the female member is a blind hole rectangular in cross section and open exclusively at the flange. The blind hole has opposed inner wall surfaces provided with a pair of engaging projections. The shank of the male member has a leading end of a width smaller than a distance between a pair of engaging projections. The leading end of the shank has a pair of protruding shoulders of a width substantially the same as the smaller width and of a length slightly larger than the distance between the pair of engaging projections so that the protruding shoulders can be engaged with the engaging projections, and form, in lateral parts existing on a diagonal line of the protruding shoulders, a pair of cut faces for allowing rotation of the male member when the male member is to be extracted from the female member.

The present invention will be better understood and objects, features, and characteristics thereof other than those set forth above will become apparent when consideration is given to the detailed description to be give hereinbelow with reference to the accompanying drawings.

DESCRIPTION OF THE PREFERRED EMBODIMENT

Figure 1:
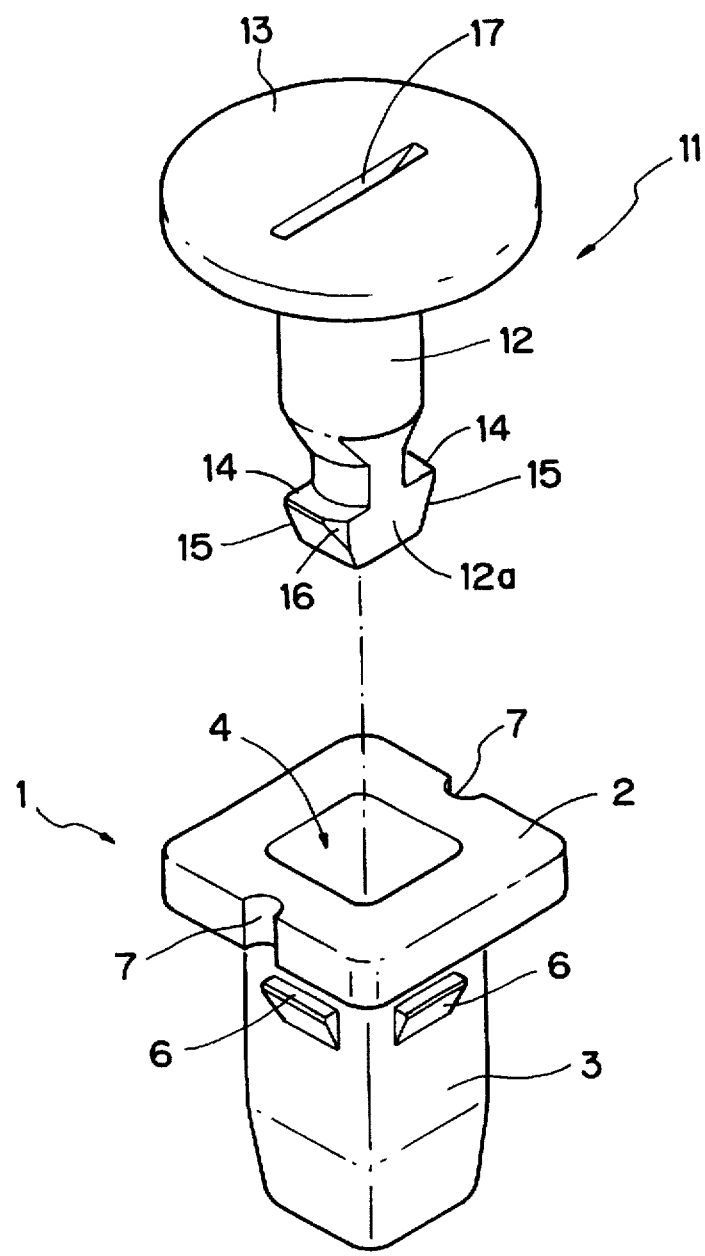
FIG. 1 is an exploded perspective view of a fixing clip according to one embodiment of this invention.

The present invention will now be described more specifically with reference to one embodiment illustrated in the drawings.

As shown in FIG. 1, the fixing clip according to the illustrated embodiment comprises two parts, i.e. a female member 1 having an inner hole 4 bored from a flange 2 through a barrel 3 thereof and a male member 11 provided with a shank 12 fit for insertion into the inner hole 4 of the female member.

Figure 2:
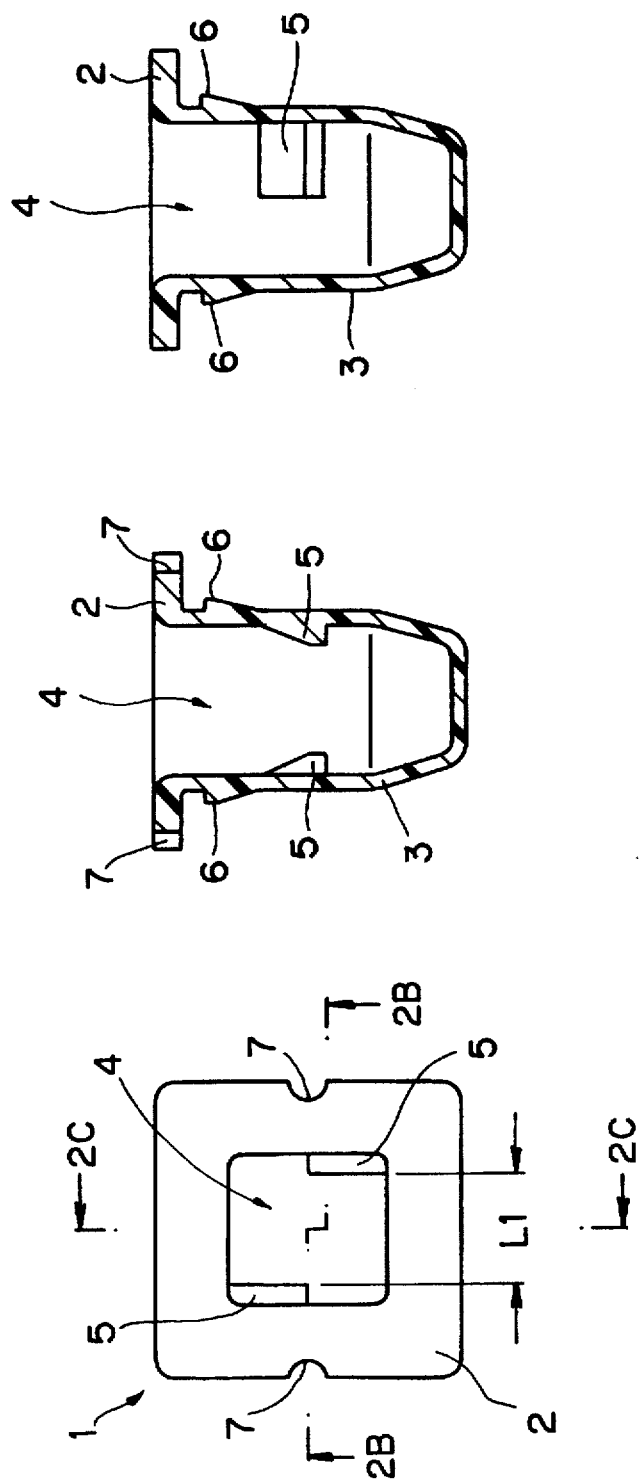
FIG. 2A is a plan view of a female member, one part of the fixing clip.
FIG. 2B is a cross section of the female member taken along line 2B—2B in FIG. 2A.
FIG. 2C is a cross section of the female member taken along line 2C—2C in FIG. 2A.

The female member 1 is a one-piece mold of synthetic resin. As shown in FIGS. 2A through 2C, the inner hole 4 bored in the barrel 3 assuming a regular rectangular cross section is formed in the shape of a blind hole regularly rectangular in cross section and open only on the side of the flange 2, which is similar in cross section. A pair of engaging projections 5 have a distance L1 therebetween and are formed on the diagonally opposed inner wall surfaces of the blind inner hole 4 at mutually staggered positions. At the same time, protuberances 6 adapted for engagement with the edge of a fitting hole H2 formed beforehand in a given panel P2 (FIG. 5) are formed with one on each of the outer wall surfaces of the barrel 3. Notches 7 serve as marks and are formed at the centers of the edges of the flange 2 on the sides of the engaging projections 5. The pair of engaging projections 5 are formed so as to occupy one half of the respective areas of the relevant wall surfaces of the barrel 3; their lower edges assume a rectangular shape.

Figure 3:
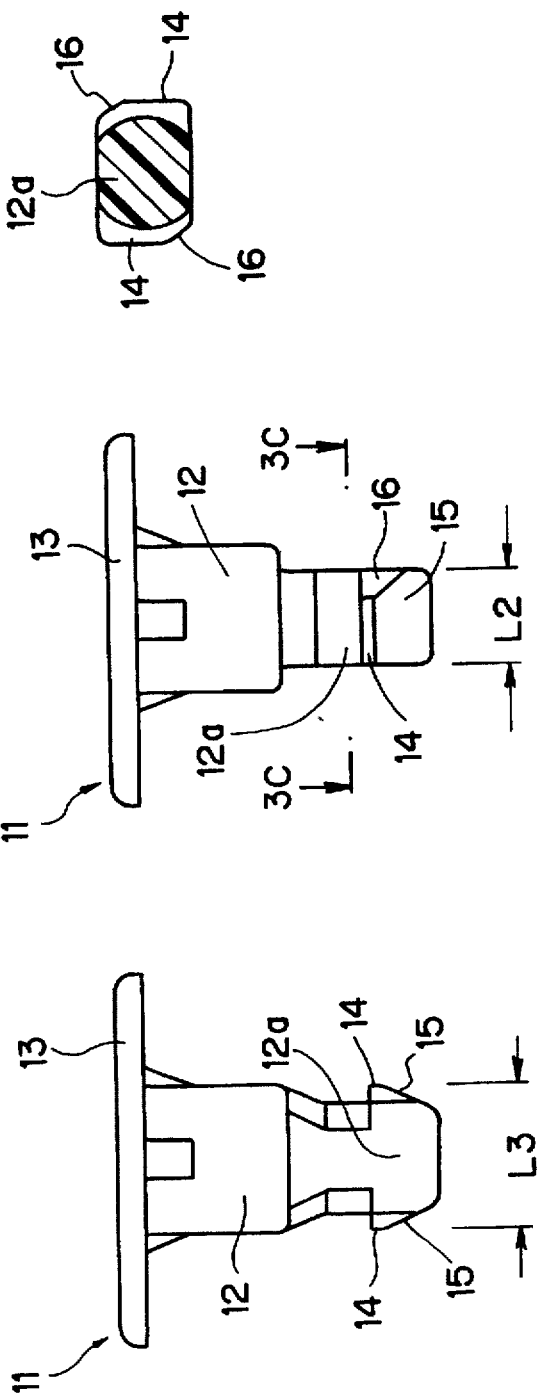
FIG. 3A is a front view of a male member, the other part of the fixing clip.
FIG. 3B is a side view of the male member.
FIG. 3C is a cross section of the male member taken along line 3C—3C in FIG. 3B.

The male member 11 is likewise a one-piece mold of synthetic resin. As shown in FIGS. 3A through 3C, the opposed portions on a leading end 12a of the shank 12, pendent from an enlarged head 13, are chamfered so as to give to the leading end 12a a linear width L2 smaller than the distance L1 separating the pair of engaging projections 5 of the female member 1. On the opposite sides of the leading end 12a of the smaller width L2, a pair of protruding shoulders 14 are provided in the same width as the width L2 of the leading end 12a and in a total length L3 slightly larger than the distance L1 between the pair of engaging projections 5 of the female member 1 so that the protruding shoulders 14 can be engaged with the engaging projections 5 of the female member 1, and Guide faces 15 converging downward are formed on the lower edges of the pair of protruding shoulders 14 and, at the same time, tapered cut faces 16 adapted to allow rotation of the male member 11 when the male member 11 is to be extracted from the female member 1 are continuously formed on the lateral parts located on the diagonal line of the guide faces 15. The enlarged head 13 is provided in the upper face thereof with a manipulating groove 17 for admitting the leading end of a tool (not shown).

The use of the female member 1 and the male member 11 constructed as described above in fixing a fitting part P1 having a through hole H1 (FIG. 5), such as a bumper of an automobile, to the panel P2 is effected by tacking the barrel 3 of the female member 1 to the fitting hole H2 of the panel P2. A nipping action is produced jointly by the flange 2 and the protuberances 6. The through hole H1 of the fitting part P1 is made to coincide with the blind inner hole 4 of the barrel 3. The shank 12 of the male member 11 is inserted into the blind inner hole 4 of the barrel 3 while keeping the protruding shoulders 14 in alignment with the positions of the notches 7.

Figure 4:
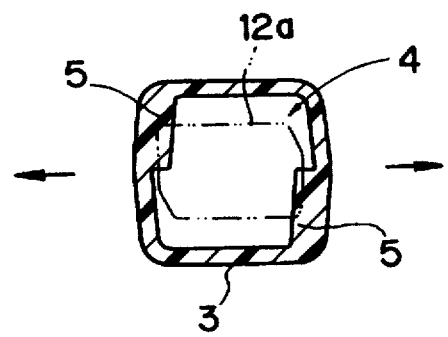
FIG. 4 is an explanatory view showing the state in which a leading end of a shank of the male member is inserted into a blind inner hole of the female member.

As a result, the shank 12 of the male member 11 is easily inserted into the blind inner hole 4 without the use of very strong force because the pair of protruding shoulders 14 are allowed to smoothly pass the engaging projections 5, positioned as staggered, while, as shown in FIG. 4, spreading outward the centers of the wall surfaces on which the engaging projections 5 are provided.

Figure 5:
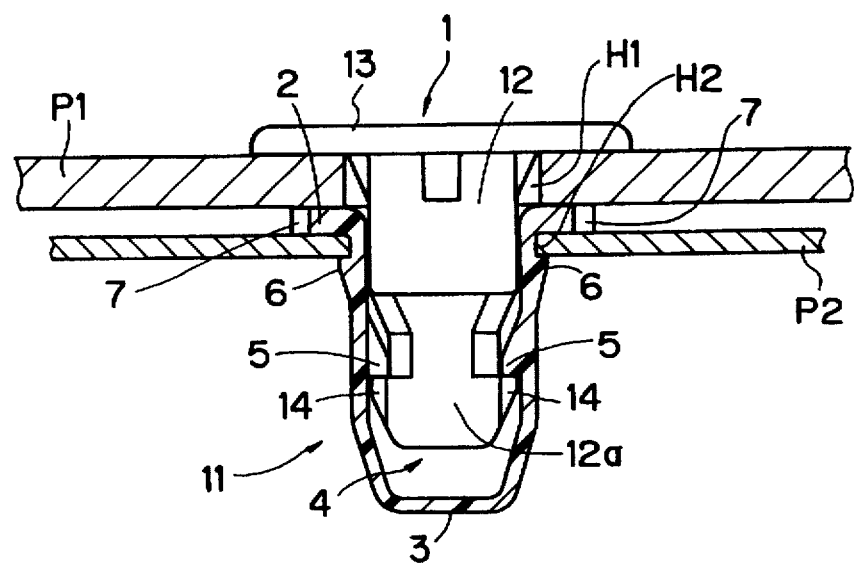
FIG. 5 is a cross section of an essential part showing the state in which a fitting part is fixed onto a panel.

After the protruding shoulders 14 have passed the engaging projections 5, as shown in FIG. 5, these shoulders 14 are automatically engaged with the lower sides of the corresponding engaging projections 5 and, as a result, the fitting part P1 is fixed to the panel P2 in a fully waterproofed state. At this time, since the lower edges of the engaging projections 5 are rectangular, the force with which the protruding shoulders 14 are joined to the engaging projections 5 is strong in spite of the weak force used for the insertion.

Figure 6:
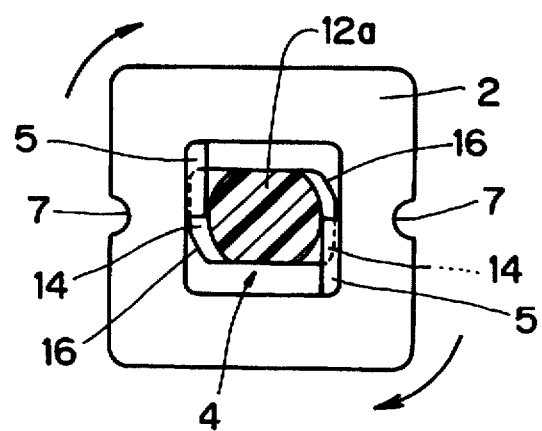
FIG. 6 is an explanatory view showing the state in which a pair of protruding shoulders formed on the shank of the male member have been brought into engagement with corresponding engaging projections.

The removal of the fixed fitting part P1 from the panel P1 is effected by inserting the leading end of a tool (not shown) into the manipulating groove 17 provided in the enlarged head 13 of the male member 11 and rotating the male member 11 by an angle of about 90 degrees inside the blind inner hole 4 in a direction in which the cut faces 16 are absent (the direction of the arrow shown in FIG. 6).

Figure 7:
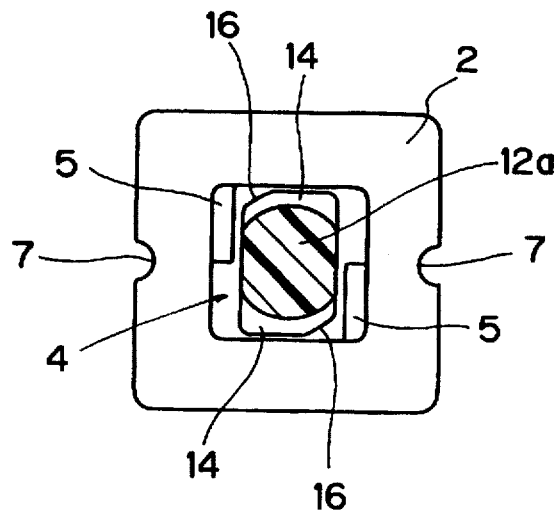
FIG. 7 is an explanatory view showing the state in which the pair of protruding shoulders of the male member have been relieved of the engagement with the engaging projections in the blind hole of the female member in consequence of the rotation of the male member.

As a result, the pair of protruding shoulders 14 disposed on the leading end 12a of smaller width of the shank 12 are rotated in the same direction and gradually relieved of engagement with the corresponding engaging projections 5, and are eventually positioned, as shown in FIG. 7, between the engaging projections 5 owing to the presence of the cut faces 16 formed in a diagonal pattern.

Thereafter, the fitting part P1 can be easily removed from the panel P2 by simply pulling the shank 12 of the male member 11 out of the blind inner hole 4.

Moreover, since this removal of the fitting part P1 has absolutely no possibility of inflicting breakage or deformation on the female and male members 1 and 11, the fixing clip can be safely put to use again.

While the pair of engaging projections 5 for engagement with the protruding shoulders 14 on the male member 11 are disposed on the opposed wall surfaces of the barrel 3 of the female member 1 in such a manner that their positions are staggered from each other by within one half of the areas of the wall surfaces in the embodiment described above, the pair of engaging projections 5 may be so disposed on the entire area of the opposed wall surfaces as to be opposed with perfect coincidence. When the pair of engaging projections 5 are so disposed as to occupy staggered positions as in the embodiment described above, they offer the following advantage in addition to the advantage of allowing a decrease in the force of insertion.

Figure 8:
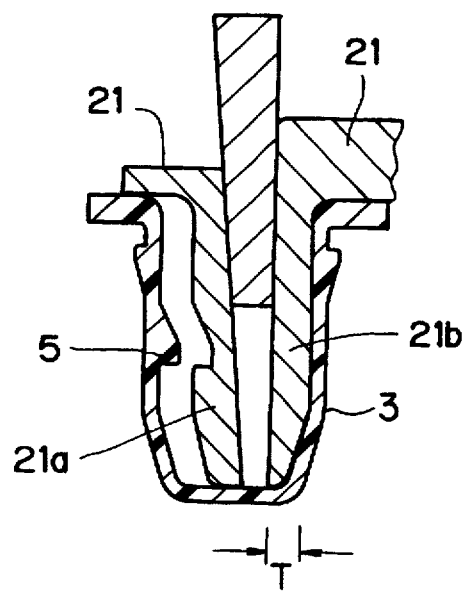
FIG. 8 is an explanatory view showing one example of the structure of a sliding split die for the formation of the female member.

For the purpose of enabling the pair of engaging projections 5 to be engaged strongly with the protruding shoulders 14, it is appropriate that the lower edges thereof be rectangular. When this rectangular lower edge is to be formed with a sliding split die structure, this structure is capable of infallibly conferring a thickness T (FIG. 8) necessary in terms of strength on at least a part 21b of a split segment 21 from which the engaging projections 5 are absent, let alone a position 21a of the split segment 21 opposed to the engaging projections 5. This fact contributes immensely to increasing the durability of the split die.

The formation of the rectangular lower edge implemented as described above, therefore, obviates the necessity for enlarging the split die structure in due respect of the wall thickness of the split segment 21 required for necessary durability as in the case of disposing the pair of engaging projections 5 on the entire areas of the opposed wall surfaces of the blind inner hole 4 to permit perfect coincidence. Thus, the female member 1 is allowed to have an arbitrarily selected size and is liberated from the possibility of being subject to a design restriction. This invention, when necessary, may be otherwise variously embodied and practiced even with respect to the other component parts within the scope of this invention.

Thus as can be seen from FIG. 5, as well as FIG. 1 in the above description, the shank 12 is circular in cross section. In FIG. 5, it can be seen that this cross sectional shape is such that the circle has substantially the same diameter as one side of the regular rectangle of the lateral cross section of the blind inner hole of the female member 11.

Owing to the adoption of the structure described above, this invention enables the fixing clip to have perfect waterproofness without requiring the use of such a waterproofing cap as is used in the prior art fixing clip. At the same time, it permits easy removal of a fitting part from a panel and naturally allows the fixing clip to enjoy enhanced practical serviceability. Since the fixing clip of the present invention only requires the male member thereof to be rotated by an angle of 90 degrees in attaining the necessary removal of the fitting part, the work of removing the fitting part is facilitated to a great extent.

When the structure in which the pair of engaging projections are so disposed on the diagonal line as to occupy mutually staggered positions is adopted, the work of inserting the shank of the male member into the blind inner hole of the female member can be fulfilled with ease. Also from this point of view, the structure can be expected to improve the efficiency of operation of the fixing clip. The sliding split die structure is capable of amply securing a necessary thickness for the split segment, and also contributes to increasing the durability of the split die itself.

What is claimed is:

1. A fixing clip comprising:

a female member comprising a barrel having a flange at one end and an inner hole extending into said barrel from said flange; and a male member comprising a shank for insertion into said inner hole of said female member;

wherein said inner hole of said female member is a blind hole that is rectangular in cross-section and open only at said flange, said blind hole having opposed inner wall surfaces provided with a pair of engaging projections;

wherein said shank of said male member has a leading end having a width smaller than a distance between said engaging projections and a pair of protruding shoulders having a width substantially the same as the width smaller than the distance between said engaging projections and a length larger than the distance between said engaging projections such that said protruding shoulders can be engaged with said engaging projections;

wherein said protruding shoulders have cut faces formed on lateral parts thereof and located on a diagonal line that is diagonal with respect to a cross-section through said leading end of said shank so as to allow rotation of said male member when said male member is to be removed from said female member; and wherein said engaging projections are disposed on said opposed inner wall surfaces so as to occupy mutually staggered positions with respect to the diagonal when said shank is in said blind inner hole and said protruding shoulders are engaged with said engaging projections.

2. The fixing clip of claim 1, wherein said inner hole of said female member has a lateral cross-section that is a regular rectangle and said shank has a lateral cross-section that is a circle having a diameter substantially the same as one side of the regular rectangle of the lateral cross section of said female member.

3. A fixing clip comprising:

a female member comprising a barrel having a flange at one end and an inner hole extending into said barrel from said flange;

a male member comprising a shank for insertion into said inner hole of said female member;

wherein said inner hole of said female member is a blind hole open at said flange, said blind hole having opposed inner wall surfaces provided with a pair of engaging projections, said engaging projections being disposed on said opposed inner wall surfaces so as to occupy mutually staggered positions; and wherein said shank of said male member has a leading end having a pair of protruding shoulders having a length larger than the distance between said engaging projections such that said protruding shoulders can be engaged with said engaging projections.

4. The fixing clip of claim 3, wherein each of said protruding shoulders comprises a first portion to be engaged with said engaging projections and a second portion that is not to be engaged with said engaging projections, said second portion having a length smaller than said first portion.

5. The fixing clip of claim 4, wherein each said second portion is formed on a lateral part of a respective said protruding shoulder with a cut face so as to allow rotation of said male member when said male member is to be removed from said female member.

6. The fixing clip of claim 3, wherein said engaging projections are staggered with respect to each other so that one of said engaging projections has no part thereof directly confronting the other of said engaging projections.

7. The fixing clip of claim 3, wherein said engaging projections are staggered from each other within one half of the cross-sectional width of the opposed inner surfaces.

8. The fixing clip of claim 3, wherein said female member has opposed outer surfaces corresponding to the opposed inner surfaces, said opposed outer surfaces having centers with a pair of notches formed thereat.

9. The fixing clip of claim 3, wherein said pair of engaging projections are disposed on said opposed inner wall surface so as to occupy mutually staggered positions such that each of said pair of engaging projections directly faces a portion of one of said opposed inner wall surfaces substantially unoccupied by the other of said pair of engaging projections.

10. The fixing clip of claim 3, wherein said pair of engaging projections are disposed so as to lie mostly on opposite sides of a line extending between the center of each of said opposed inner wall surfaces as seen in lateral cross-section.

* * * * *